(12) United States Patent
Takano

(10) Patent No.: US 11,500,639 B2
(45) Date of Patent: Nov. 15, 2022

(54) ARITHMETIC PROCESSING APPARATUS AND CONTROL METHOD USING ORDERING PROPERTY

(71) Applicant: FUJITSU LIMITED, Kawasaki (JP)

(72) Inventor: Hideyuki Takano, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 59 days.

(21) Appl. No.: 16/419,040

(22) Filed: May 22, 2019

(65) Prior Publication Data

US 2019/0384610 A1    Dec. 19, 2019

(30) Foreign Application Priority Data

Jun. 15, 2018    (JP) .............................. JP2018-114403

(51) Int. Cl.
*G06F 9/38* (2018.01)
(52) U.S. Cl.
CPC .......... *G06F 9/3834* (2013.01); *G06F 9/3836* (2013.01)
(58) Field of Classification Search
CPC ... G06F 9/3834; G06F 9/3836; G06F 9/30043
See application file for complete search history.

(56) References Cited

U.S. PATENT DOCUMENTS

| 5,737,636 | A | * | 4/1998 | Caffo | ..................... | G06F 9/3834 |
| | | | | | | 710/54 |
| 6,732,297 | B2 | * | 5/2004 | Oura | .................... | G06F 11/2236 |
| | | | | | | 714/E11.166 |
| 2005/0060600 | A1 | | 3/2005 | Jeddeloh | | |
| 2008/0133205 | A1 | * | 6/2008 | Adir | ......................... | G06F 30/33 |
| | | | | | | 703/15 |
| 2018/0004522 | A1 | * | 1/2018 | Agarwal | .............. | G06F 9/30043 |
| 2019/0354308 | A1 | * | 11/2019 | Li | .......................... | G06F 11/348 |

FOREIGN PATENT DOCUMENTS

JP        2006-31156        2/2006

OTHER PUBLICATIONS

Japanese Office Action dated Feb. 8, 2022 for corresponding Japanese Patent Application No. 2018-114403 with, English Translation, 7 pages.

* cited by examiner

*Primary Examiner* — Shawn Doman
(74) *Attorney, Agent, or Firm* — Fujitsu Patent Center

(57) ABSTRACT

An arithmetic processing apparatus includes a memory, a first processor coupled to the memory, and a second processor coupled to the memory. The first processor is configured to consecutively issue a plurality of load instructions for reading respective data with respect to the memory. The first processor is configured to determine whether an ordering property is guaranteed, based on values included in the data loaded from the memory. The second processor is configured to issue a store instruction during an execution of the plurality of load instructions with respect to the memory.

8 Claims, 14 Drawing Sheets

FIG. 14

| ACCESS DESTINATION | | DIFFERENT ADDRESSES | | SAME ADDRESS | ※2 |
|---|---|---|---|---|---|
| INSTRUCTION | LOAD INSTRUCTION-LOAD INSTRUCTION STORE INSTRUCTION-STORE INSTRUCTION | ※1 SPECIAL LOAD INSTRUCTION-LOAD INSTRUCTION SPECIAL STORE INSTRUCTION-STORE INSTRUCTION | LOAD INSTRUCTION-LOAD INSTRUCTION STORE INSTRUCTION-STORE INSTRUCTION | LOAD INSTRUCTION-LOAD INSTRUCTION STORE INSTRUCTION-STORE INSTRUCTION | LOAD INSTRUCTION-LOAD INSTRUCTION LOAD INSTRUCTION-STORE INSTRUCTION |
| PERMISSION/NON-PERMISSION OF OVERTAKING | ○ | × | × | × | × |

A1

○: PERMITTED
X: NOT PERMITTED

*1: LOAD/STORE INSTRUCTION WHICH IS PROHIBITED FROM OVERTAKE
*2: USE RESULT OF PRECEDING LOAD INSTRUCTION AS SUBSEQUENT ACCESS DESTINATION ADDRESS

ARITHMETIC PROCESSING APPARATUS AND CONTROL METHOD USING ORDERING PROPERTY

CROSS-REFERENCE TO RELATED APPLICATION

This application is based upon and claims the benefit of priority of the prior Japanese Patent Application No. 2018-114403, filed on Jun. 15, 2018, the entire contents of which are incorporated herein by reference.

FIELD

The embodiments discussed herein are related to an arithmetic processing apparatus and a control method.

BACKGROUND

As one of quality guarantee tests of an arithmetic processing apparatus, an order guarantee test is performed in order to verify an ordering property of a load (read) or store (write) instruction when a processor (central processing unit: CPU) executes the instruction.

Related techniques are disclosed in, for example, Japanese Laid-open Patent Publication No. 2006-031156.

The order guarantee test of the related art verifies the order of accesses of, for example, the load instruction and the store instruction, by a processor with respect to different addresses or the same address.

FIG. 14 illustrates a permission/non-permission of a so-called overtaking in which a subsequent (next) load or store instruction is executed prior to a preceding load or store instruction, in a processor adopting a relaxed memory ordering (RMO) method. For example, in FIG. 14, the "load instruction-load instruction" indicates that the preceding instruction is a load instruction and the subsequent instruction is a load instruction. As illustrated in FIG. 14, when an access destination of the preceding instruction and an access destination of the subsequent instruction have different addresses from each other, the overtaking is permitted, except for the "special load instruction-load instruction" and the "special store instruction-store instruction."

Meanwhile, in the processor adopting the RMO method, for the accesses to the same address, the subsequent load instruction is prohibited from overtaking the preceding load instruction or the subsequent store instruction is prohibited from overtaking the preceding store instruction (see the arrow A1 in FIG. 14). Thus, in the order guarantee test of the processor adopting the RMO method, it is important to verify that the overtaking of the accesses to the same address does not occur.

However, in the order guarantee test of the processor adopting the RMO method, there is a case where accesses to multiple different areas on a memory are attempted at the same time. In this case, a time interval may be extended until a load or store instruction to the same address is issued again.

Further, even when a processor that executes a load instruction and a processor that executes a store instruction are synchronized with each other at the time of starting the test, a timing deviation may occur in the instructions by the two processors, and as a result, for example, a store instruction may be executed after all load instructions are executed.

In this case, it is not possible to cause an overtaking of the "load instruction-load instruction" and the "store instruction-store instruction" which have the same address as the access destination. In an order guarantee circuit mounted with the processor adopting the RMO method, it is difficult to perform the desirable (accurate) order guarantee test for an overtaking of accesses to the same address, and it is difficult to verify the validity of the order guarantee circuit.

SUMMARY

According to an aspect of the present invention, provided is an arithmetic processing apparatus including a memory, a first processor coupled to the memory, and a second processor coupled to the memory. The first processor is configured to consecutively issue a plurality of load instructions for reading respective data with respect to the memory. The first processor is configured to determine whether an ordering property is guaranteed, based on values included in the data loaded from the memory. The second processor is configured to issue a store instruction during an execution of the plurality of load instructions with respect to the memory.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 14 is a view illustrating a permission/non-permission of an overtaking in an arithmetic processing apparatus according to a comparative example of the embodiment.

DESCRIPTION OF EMBODIMENTS

<Configuration of Information Processing System>

Figure 1:
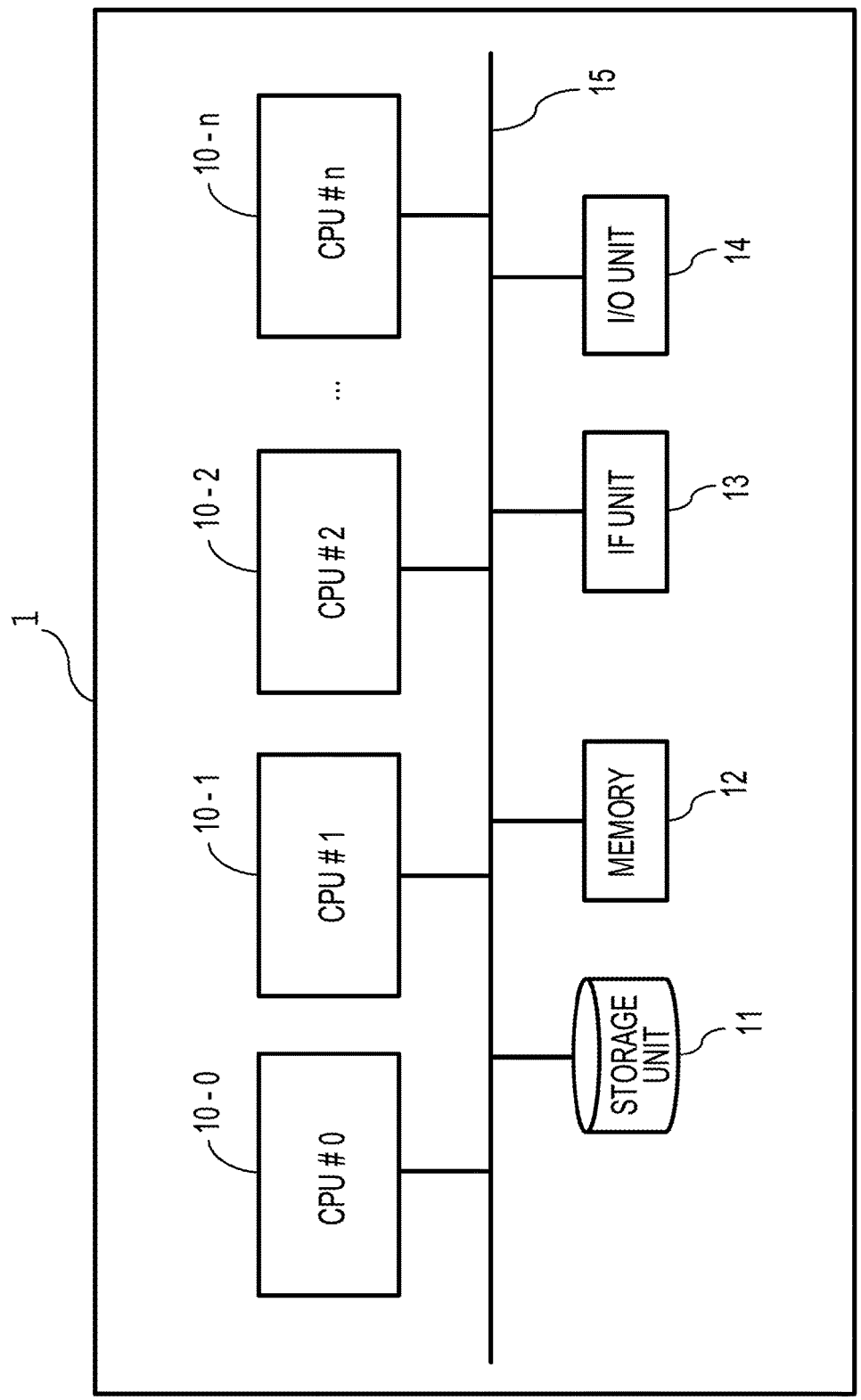
FIG. 1 is a diagram illustrating a hardware configuration of an arithmetic processing apparatus which is an example of an embodiment.

Hereinafter, embodiments of the present disclosure will be described with reference to the accompanying drawings. However, the embodiments to be described hereinafter are merely exemplary, and are not intended to exclude various modifications or technical applications which are not described hereinafter. For example, the embodiments of the present disclosure may be variously modified within a scope that does not depart from the gist of the present disclosure. Further, in the drawings referred to in the descriptions of the embodiments hereinafter, portions denoted by an identical reference numeral indicate the identical or similar portions unless specified otherwise.

<1> Embodiment

<1-1> Example of Hardware Configuration of Arithmetic Processing Apparatus According to Embodiment FIG. 1 is a diagram illustrating a hardware configuration of an arithmetic processing apparatus 1 which is an example of an embodiment.

As illustrated in FIG. 1, the arithmetic processing apparatus 1 has a multiprocessor configuration including multiple CPUs 10-0 to 10-$n$ ($n$ is an integer of 0 or more), and may include a storage unit 11, a memory 12, an interface (IF) unit 13, and an input/output (I/O) unit 14.

Specifically, the arithmetic processing apparatus 1 includes one or more CPUs 10-0, 10-1, 10-2, ..., 10-$n$. Hereinafter, with respect to the reference numerals 10-0, 10-1, 10-2, ..., 10-$n$ that indicate the CPUs, when one of the multiple CPUs needs to be specified, the reference numerals 10-0, 10-1, 10-2, ..., 10-$n$ will be used, and when an arbitrary CPU is indicated, the reference numeral 10 will be used.

In addition, the CPUs 10-0, 10-1, 10-2, ..., 10-$n$ may be indicated as CPUs #0, #1, #2, ... #n, respectively, and the numerals "0," "1," "2," ..., "n" next to the symbol # may be simply referred to as CPU numbers. In addition, the CPUs 10 are connected to each other so as to be able to communicate via a bus 15.

The CPUs 10 control the arithmetic processing apparatus 1 so as to perform, for example, the order guarantee test, by executing an OS (operating system) or a program stored in the storage unit 11 to be described later. In the present embodiment, the CPUs 10 execute a test program 100 to be described later using, for example, FIG. 3. Moreover, the test program 100 includes a test program for test target processor 101 and a test program for test auxiliary processor 102.

The storage unit 11 is an example of hardware that stores, for example, various data and programs. For example, the storage unit 11 may be used as a secondary storage device of the arithmetic processing apparatus 1, and may store an OS or firmware, a program such as application or the like, and various data. For example, the storage unit 11 may be a solid state drive (SSD) or a storage class memory (SCM), in addition to a magnetic disk device such as a hard disk drive (HDD) or the like. In addition, the storage unit 11 may store programs that implement all or part of the various functions of the arithmetic processing apparatus 1.

The memory 12 is an example of hardware that stores various data or programs. The memory 12 may be a volatile memory such as a random access memory (RAM) or the like, or a nonvolatile memory such as a flash memory, an SCM, a read only memory (ROM) or the like. In addition, the memory 12 may store the test program 100 or data.

The IF unit 13 is an example of a communication interface that performs, for example, a control of a connection and a communication with an external device (not illustrated) via an external network or the like.

The I/O unit 14 may include at least one of input devices such as, for example, a mouse, a keyboard, a touch panel, and operation buttons.

The bus 15 connects the CPUs 10 to each other to be able to communicate, and simultaneously, connects the CPUs 10 to the storage unit 11, the memory 12, the IF unit 13, and the I/O unit 14.

Further, the arithmetic processing apparatus 1 may be connected to, for example, a management terminal of an administrator (not illustrated) via a network (not illustrated).

<1-2> Example of Hardware Configuration of Order Guarantee Test in Arithmetic Processing Apparatus According to Embodiment An example of a hardware configuration of the order guarantee test in the present arithmetic processing apparatus will be described using FIG. 2.

Figure 2:
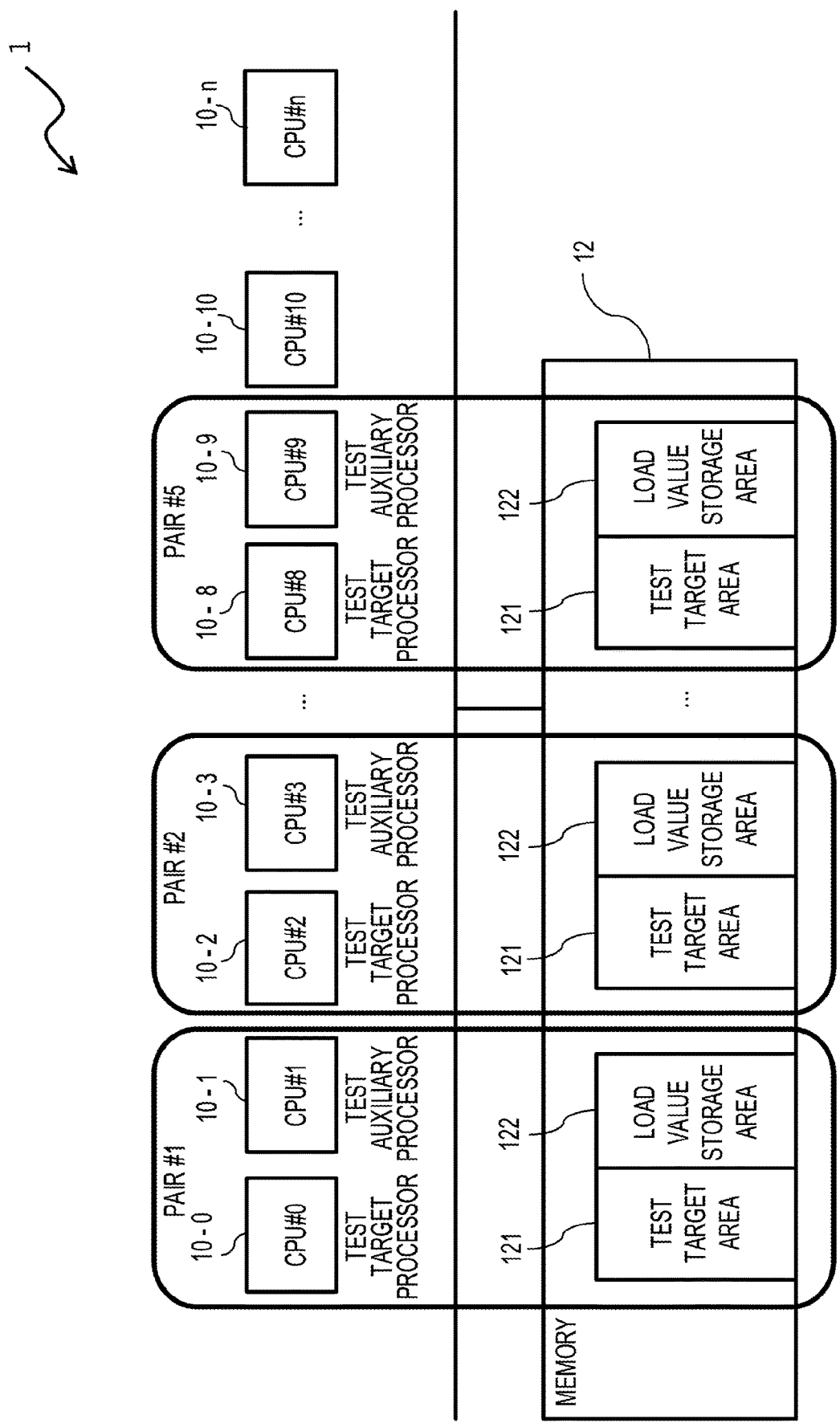
FIG. 2 is a view illustrating a hardware configuration of an order guarantee test in the arithmetic processing apparatus which is an example of the embodiment.

FIG. 2 is a view illustrating a hardware configuration of the order guarantee test in the arithmetic processing apparatus 1 which is an example of the embodiment illustrated in FIG. 1.

As illustrated in FIG. 2, in the present embodiment, it is assumed that the two processors 10 are combined with each other to form a pair (one set), and the order guarantee test is performed in the unit of the pair.

FIG. 2 illustrates an example where CPUs #0 and #1 are combined with each other to form Pair #1, CPUs #2 and #3 are combined with each other to form Pair #2, and CPUs #8 and #9 are combined with each other to form Pair #5, and the order guarantee test is performed in the unit of the pairs. In addition, in the present embodiment, the processors 10 of which the CPU numbers are adjacent to each other are combined with each other to form a pair. However, the combination method is not limited thereto.

In each pair, one processor 10 is caused to function as a processor 10 to be tested, that is, a test target processor 10, and the other processor 10 is caused to function as a processor 10 which causes an overtaking status, that is, a test auxiliary processor 10. FIG. 2 illustrates an example where the processor 10 of which the CPU number is an even number (e.g., CPU #0, #2 or #8) is caused to function as the test target processor 10, and the processor 10 of which the CPU number is an odd number (e.g., CPU #1, #3 or #9) is caused to function as the test auxiliary processor 10. The test target processor 10 may be referred to as a first processor, and the test auxiliary processor 10 may be referred to as a second processor.

In the present embodiment, in each pair, the processor 10 of which the CPU number is relatively small or is an even number (CPU #0, #2 or #8) is allocated to the test target processor 10. However, the present disclosure is not limited thereto. Further, in the present embodiment, in each pair, the processor 10 of which the CPU number is relatively large or an odd number (CPU #1, #3 or #9) is allocated to the test auxiliary processor 10. However, the present disclosure is not limited thereto.

As illustrated in FIG. 2, the memory 12 includes a test target area 121 and a load value storage area 122 for each pair. The test target area 121 is an area where a value of an access destination of a load or store instruction is stored, and the value is written to the test target area 121 by a store instruction. In addition, the load value storage area 122 is an area where values (load values) read by a load instruction are stored in an integrated form, and the integrated value is written to the load value storage area 122 by a store instruction.

In addition, it is assumed that the test target processor 10 and the test auxiliary processor 10 included in each pair commonly use the test target area 121 and the load value storage area 122 on the memory 12. In addition, the value stored in the test target area 121 may be referred to as a stored value.

<1-3> Example of Functional Configuration of Arithmetic Processing Apparatus According to Embodiment A functional configuration of the present arithmetic processing apparatus will be described using FIG. 3, with reference to FIGS. 4 to 8.

Figure 3:
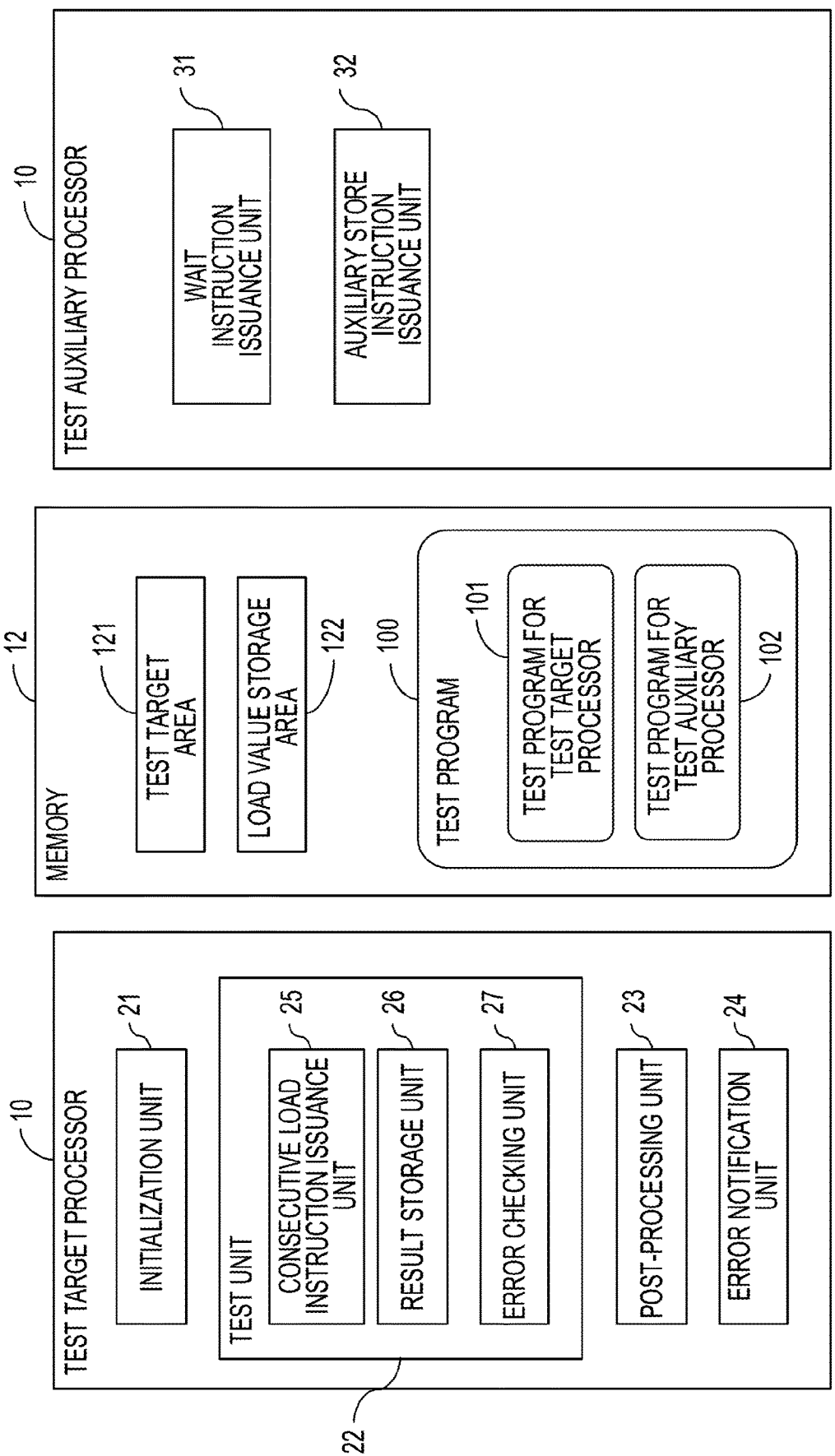
FIG. 3 is a view illustrating a functional configuration of the arithmetic processing apparatus which is an example of the embodiment.

FIG. 3 is a view illustrating a functional configuration of the arithmetic processing apparatus 1 which is an example of the embodiment illustrated in FIG. 2.

Figure 4:
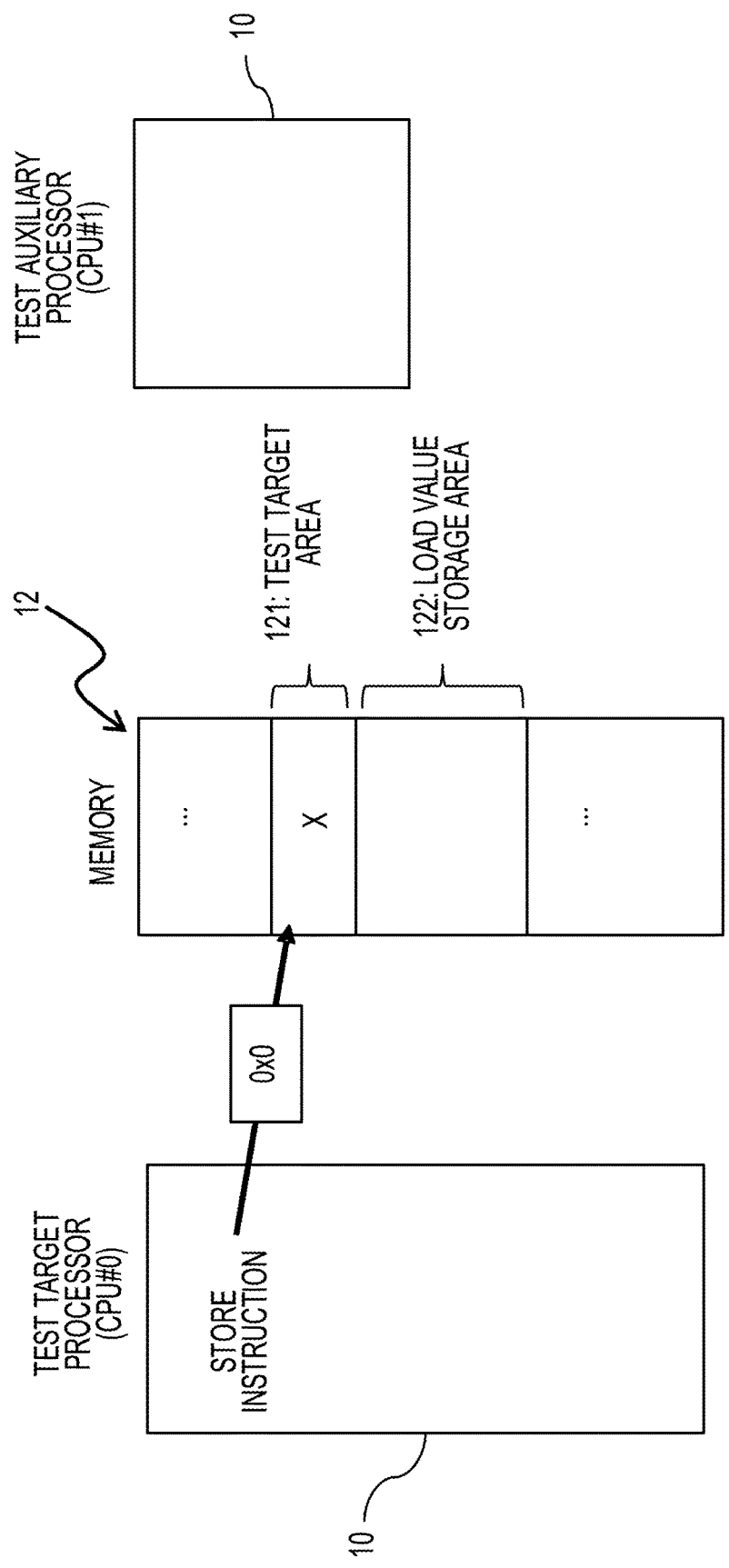
FIG. 4 is a view illustrating a process performed by an initialization unit in the arithmetic processing apparatus which is an example of the embodiment.
Figure 5:
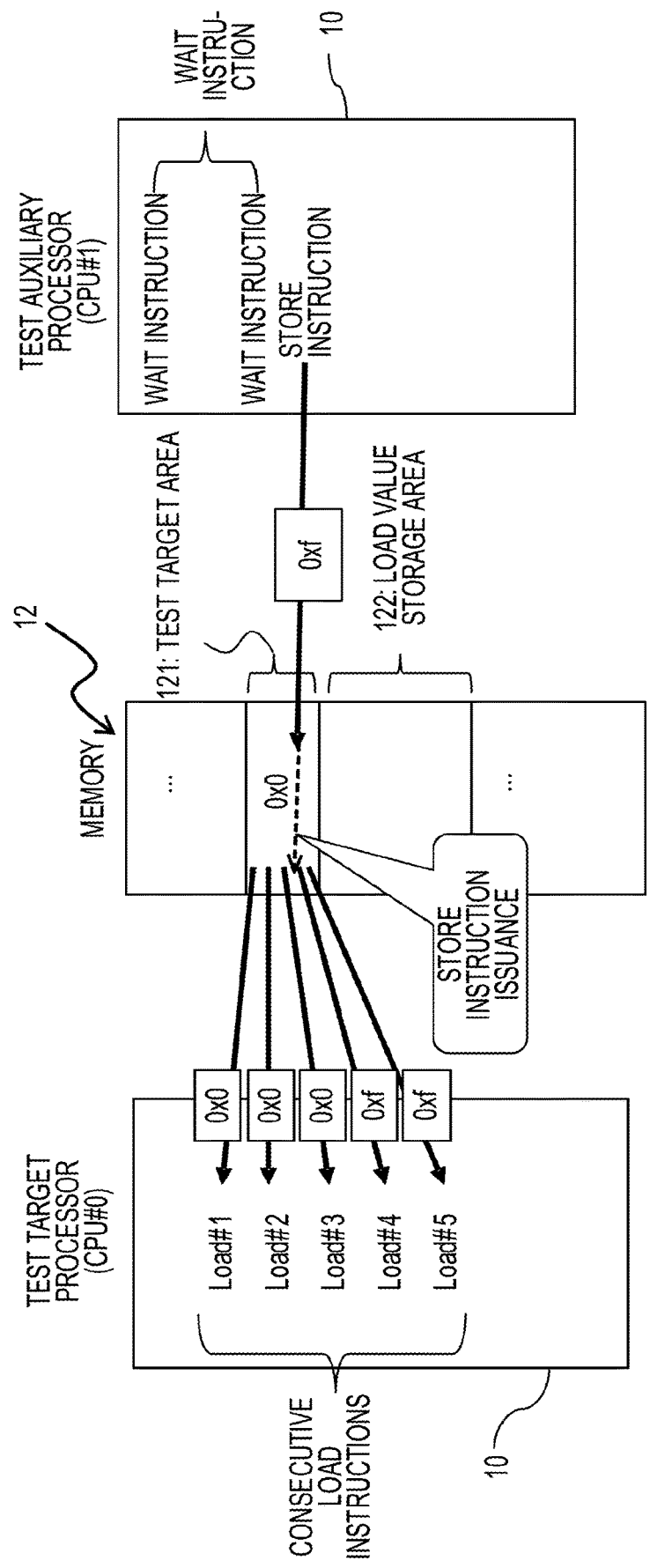
FIG. 5 is a view illustrating a process performed by each of a consecutive load instruction issuance unit, a wait instruction issuance unit, and an auxiliary store instruction issuance unit in the arithmetic processing apparatus which is an example of the embodiment.
Figure 6:
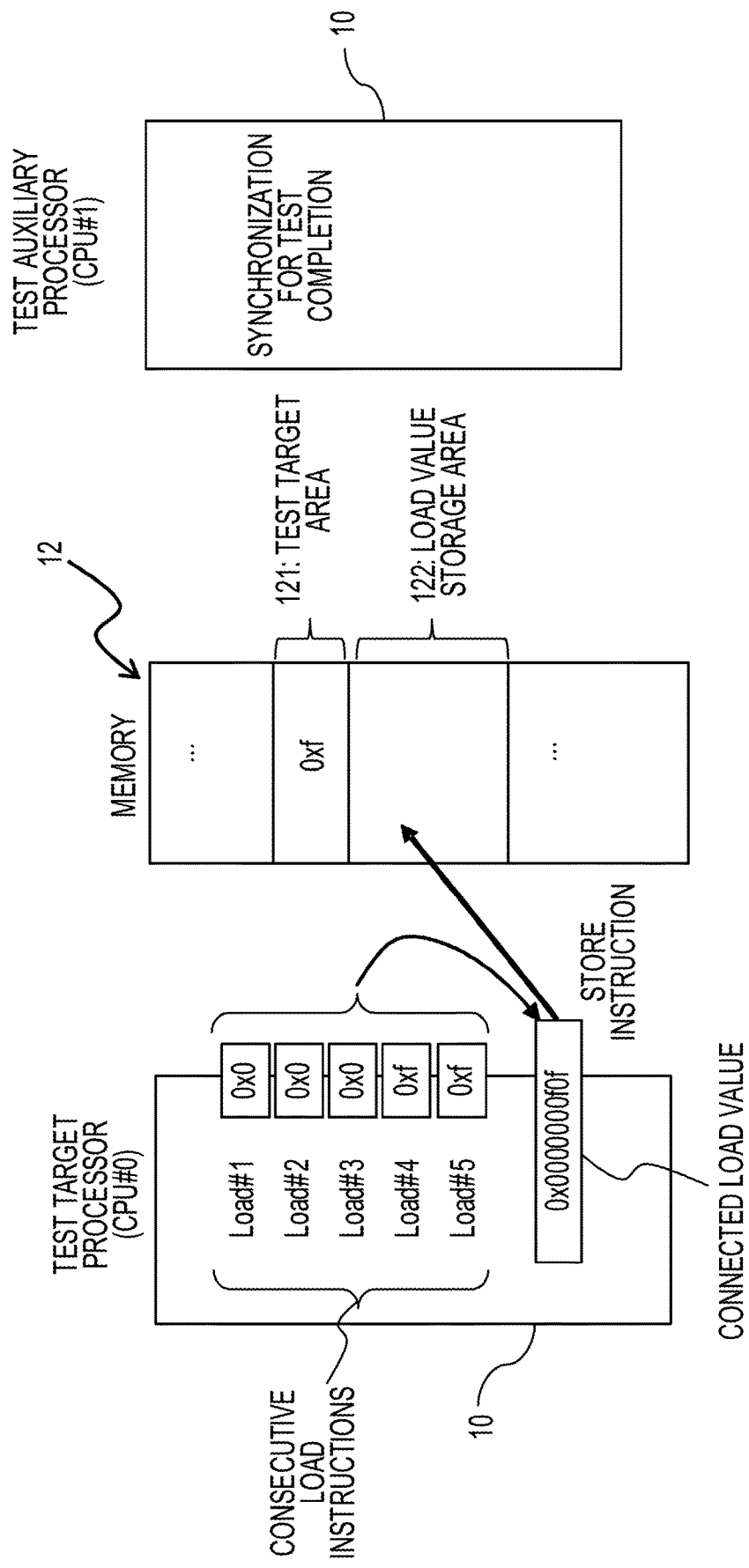
FIG. 6 is a view illustrating a process performed by a result storage unit in the arithmetic processing apparatus which is an example of the embodiment.
Figure 7:
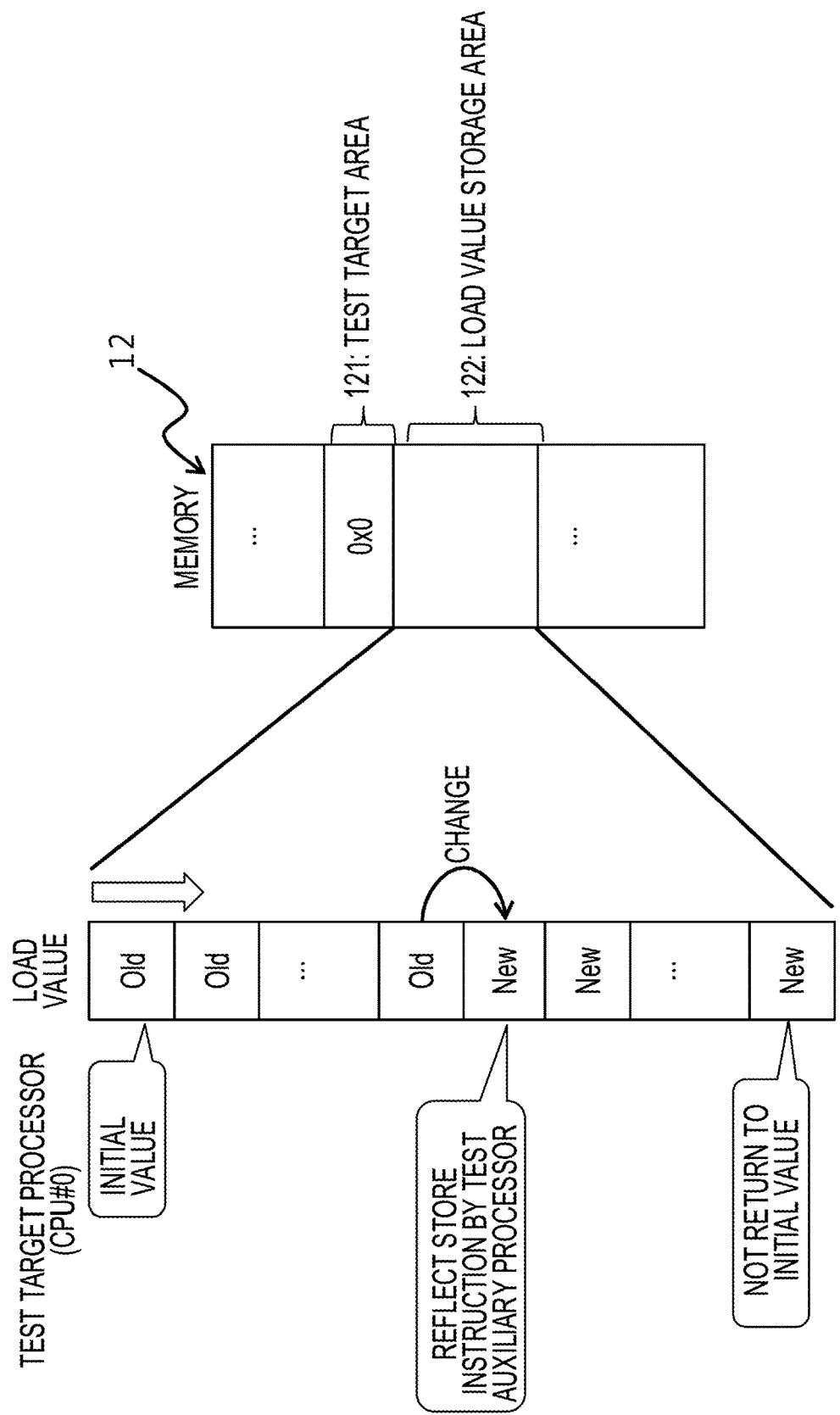
FIG. 7 is a conceptual view of a case where an overtaking of a preceding load instruction by a subsequent load instruction does not occur, in the arithmetic processing apparatus which is an example of the embodiment.
Figure 8:
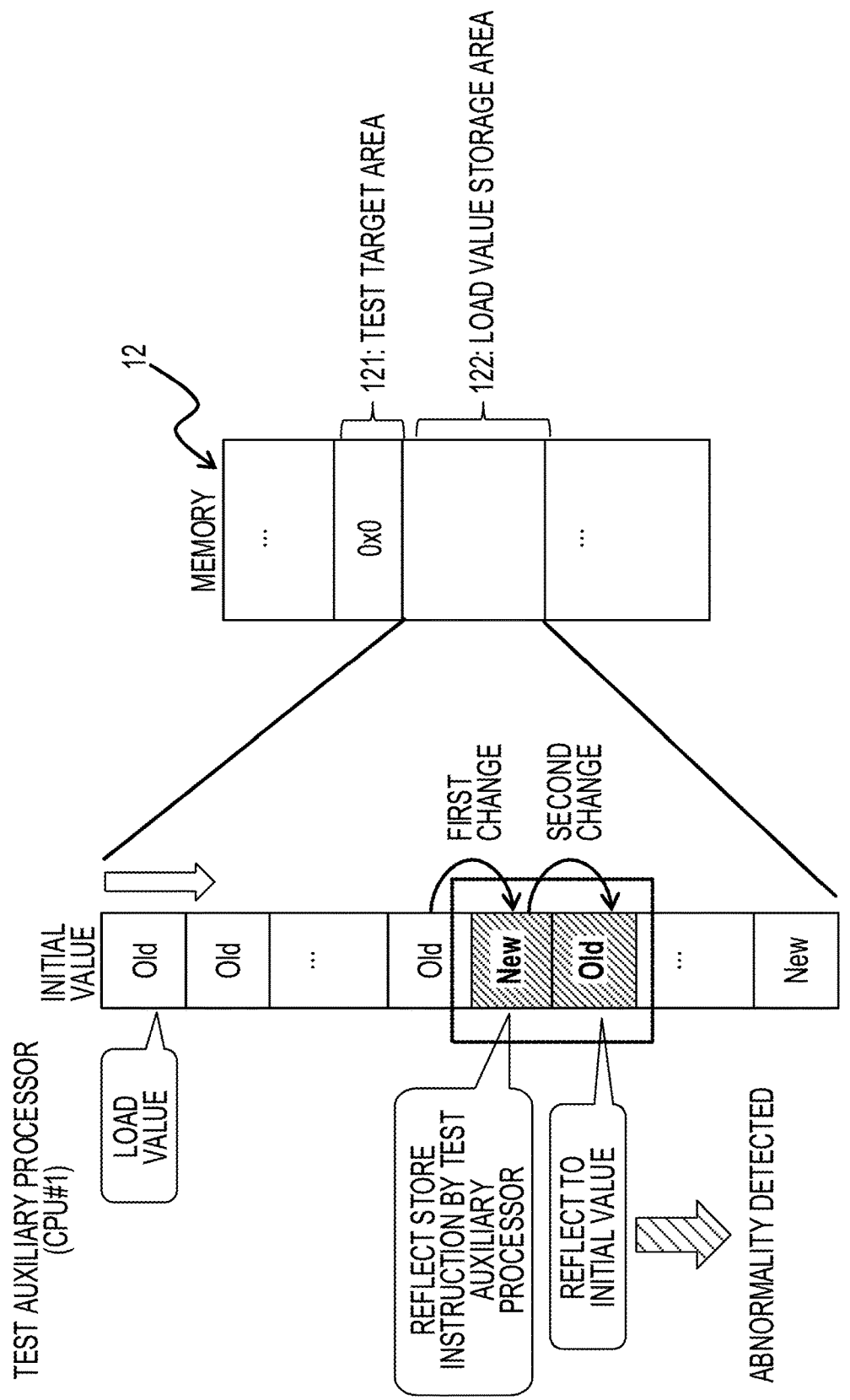
FIG. 8 is a conceptual view of a case where an overtaking of a preceding load instruction by a subsequent load instruction occurs, in the arithmetic processing apparatus which is an example of the embodiment.

FIG. 4 is a view illustrating a process performed by an initialization unit 21, and FIG. 5 is a view illustrating a process performed by each of a consecutive load instruction issuance unit 25, a wait instruction issuance unit 31, and an auxiliary store instruction issuance unit 32. FIG. 6 is a view illustrating a process performed by a result storage unit 26. FIG. 7 is a conceptual view of a case where an overtaking of a preceding load instruction by a subsequent load instruction does not occur, and FIG. 8 is a conceptual view of a case where an overtaking of a preceding load instruction by a subsequent load instruction occurs.

FIGS. 3 to 8 illustrate the order guarantee test in a case where CPU #0 (10-0) is caused to function as the test target processor 10, and CPU #1 (10-1) is caused to function as the test auxiliary processor 10. However, the order guarantee test may be performed in parallel in the other pairs of the CPUs 10 as well. In that case, it is assumed that the areas other than the test target area 121 and the load value storage area 122 which are used by CPUs #0 and #1 on the memory 12 are used.

First, a functional configuration of the test target processor 10 in the present arithmetic processing apparatus 1 will be described.

As illustrated in FIG. 3, the test target processor 10 includes functions of the initialization unit 21, a test unit 22, a post-processing unit 23, and an error notification unit 24, and the test unit 22 includes functions of the consecutive load instruction issuance unit 25, the result storage unit 26, and an error checking unit 27.

The initialization unit 21 issues a store instruction to the test target area 121 so as to initialize the test target area 121, and stores a predetermined value (initial value). For example, as illustrated in FIG. 4, the initialization unit 21 stores "0x0" for the test target area 121.

Further, the initialization unit 21 also initializes a value of N that indicates the number of times of an issuance of load instructions which are issued consecutively by the consecutive load instruction issuance unit 25 to be described later, to "0."

The test unit 22 performs a process from the issuance of instructions until the storage of results in the present order guarantee test. Specifically, as illustrated in FIG. 3, the test unit 22 may include the consecutive load instruction issuance unit 25, the result storage unit 26, and the error checking unit 27. Subsequently, the functional configuration will be described.

The consecutive load instruction issuance unit 25 issues a consecutive load instruction to consecutively perform a loading operation a predetermined number of times, with respect to the same address in the test target area 121. By the consecutive load instruction, multiple load instructions for reading pieces of data, respectively, are consecutively issued a predetermined number of times. In the present embodiment, assuming that among registers (not illustrated) of CPU #0 which is the test target processor 10, the number of registers capable of storing load values is N (N is an integer of 1 or more), the load instructions are consecutively issued N times in the consecutive load instruction issued once. In addition, the number (N) of registers capable of storing load values may vary according to, for example, the type of the processor 10, and in this case, the number of individual load instructions included in the consecutive load instruction is N.

The process performed by the consecutive load instruction issuance unit 25 will be described using the example in FIG. 5. As illustrated in FIG. 5, the consecutive load instruction issuance unit 25 issues multiple consecutive load instructions (Loads #1 to #5) to the same address in the test target area 121. In the present example, it is assumed that the number of registers capable of storing load values in the test target processor 10 is five (N is 5). Accordingly, the respective load instructions included in the consecutive load instruction are to access the same address on the test target area 121 of the memory 12. Thus, when there is no change in the value stored in the area specified by the corresponding address, the initialization unit 21 reads the initial value ("0x0"). The initial value may be referred to as "Old."

In addition, as illustrated in FIG. 5, it is assumed that after the first to third load instructions (Loads #1 to #3) issued by the test target processor 10, for example, the test auxiliary processor 10 issues a store instruction to the address of the access destination of the corresponding load instructions (which will be described later). Then, it is assumed that the address value of the access destination of the load instructions is rewritten from the initial value ("Old") to "0xf" by the store instruction. The value written by the store instruction may be referred to as a store value or "New." In this case, the test target processor 10 obtains "0xf" ("New") as the load values by the fourth to fifth load instructions (Loads #4 and #5).

The result storage unit 26 integrates (connects) the load values which are the N results read by the consecutive load instructions issued by the consecutive load instruction issuance unit 25 as described above, so as to generate an integrated load value, that is, a connected load value. Then, the result storage unit 26 issues, for example, a store instruction to store (save) the connected load value in the load value storage area 122.

The process performed by the result storage unit 26 will be described using the example of FIG. 6. FIG. 6 illustrates an example where all of the load values by the first to third load instructions (Loads #1 to #3) are "0x0," and both of the load values by the fourth to fifth load instructions (Loads #4 and #5) are "0xf." As illustrated in FIG. 6, the result storage unit 26 connects the load values by the respective load instructions to each other in an order, so as to generate the connected load value ("0x0000000f0f") having a data length of, for example, 5 bytes. Then, the result storage unit 26 issues, for example, a store instruction to store the generated connected load value in the load value storage area 122.

In addition, as will be described later, at the time when the storage of the connected load value by the test target processor 10 is repeated M times (M is an integer of 0 or more) after the issuance of the store instruction by the test auxiliary processor 10, the test target processor 10 and the test auxiliary process 10 are synchronized with each other for a test completion guarantee. It is assumed that the synchronization for the test completion guarantee is also performed using a clock generator (not illustrated) or the like. Thus, as illustrated in FIG. 6, the test auxiliary processor 10 is in a wait state for the synchronization for the test completion guarantee until the storage of the connected load value by the test target processor 10 is completed.

Based on the value stored in the load value storage area 122 of the memory 12 by the result storage unit 26 (the connected load value), the error checking unit 27 determines an occurrence/non-occurrence of an error in the order guarantee test. The error checking unit 27 may check the change by extracting the load values read by the respective load instructions included in the consecutive load instruction, in a sequential order, from the connected load value stored in the load value storage area 122. In the present embodiment, the error determined by the error checking unit 27 may be referred to as abnormality, and indicates, for example, an occurrence of an overtaking.

Here, descriptions will be made on the process performed by the error checking unit 27 in a case where an overtaking of a preceding load instruction by a subsequent load instruction does not occur, using FIG. 7.

FIG. 7 is a conceptual view of a case where an overtaking of a preceding load instruction by a subsequent load instruction does not occur. FIG. 7 schematically represents the respective load values stored in the load value storage area 122 to be arranged in an order of being loaded, from the top.

FIG. 7 illustrates an example where the first and second load values are "Old" (initial value) and the "Old" continues as the load values for a moment. Then, it is assumed that the test auxiliary processor 10 issues the store instruction to the same address as the address of the access destination of the corresponding load instructions, so that a value of "New" which is a value different from the initial value is stored in the test target area 121. That is, it is assumed that the stored value of the test target area 121 is rewritten from the initial value of "Old" to "New" (see the arrow "change" in FIG. 7). In this case, when the test target processor 10 issues a load instruction after the corresponding store instruction is issued, it is expected that the load value will be the store value by the store instruction. That is, once the load value changes from "Old" to "New" after the issuance of the store instruction, it is preferable that the load value continues without being returned to the initial value.

In the example of FIG. 7 as well, in view of the fact that all of the load values after the issuance of the store instruction by the test auxiliary processor 10 are "New," it is understood that the expected value is obtained. From the fact that the expected value is obtained, it is understood that an overtaking does not occur in the accesses to the same address, in the order guarantee test of the corresponding processor. Thus, in this case, the error checking unit 27 determines that an overtaking of a preceding load instruction by a subsequent load instruction does not occur.

Subsequently, descriptions will be made on the process performed by the error checking unit 27 in a case where an overtaking of a preceding load instruction by a subsequent load instruction occurs.

FIG. 8 is a conceptual view of a case where an overtaking of a preceding load instruction by a subsequent load instruction occurs. Similarly to FIG. 7, FIG. 8 schematically represents the respective load values stored in the load value storage area 122 to be arranged in an order of being loaded, from the top. FIG. 8 also illustrates an example where the first and second load values are "Old" (initial value) and the "Old" continues as the load values for a while.

Unlike FIG. 7, FIG. 8 illustrates an example where the load value changes from "Old" to "New" (see the arrow "first change" in FIG. 8) after the issuance of the store instruction by the test auxiliary processor 10, and then, the load value is returned from "New" to "Old" (see the arrow "second change" in FIG. 8). When the load value is returned to "Old" despite that no store instruction has been issued to the same address as that of the load instructions after the issuance of the store instruction by the test auxiliary processor 10, it may be said that the expected value is not obtained. As described above, when the load values have changed twice (or more), the error checking unit 27 determines that an overtaking of a preceding load instruction by a subsequent load instruction occurs.

The post-processing unit 23 performs a follow-up process after the completion of the order guarantee test. For example, the post-processing unit 23 generates data for outputting a test result. Since the follow-up process performed after the completion of the test is well-known, descriptions thereof will be omitted herein.

The error notification unit 24 notifies, for example, the administrator of the order guarantee test or the arithmetic processing apparatus 1 of the occurrence/non-occurrence of the error of the overtaking which is obtained by the error checking unit 27.

Subsequently, the functional configuration of the test auxiliary processor 10 (CPU #1) in the present arithmetic processing apparatus 1 will be described.

As illustrated in FIG. 3, the test auxiliary processor 10 may include the wait instruction issuance unit 31 and the auxiliary store instruction issuance unit 32.

In order to enable the store instruction to be issued by the test auxiliary processor 10 during the issuance of the consecutive load instruction by the test target processor 10, the wait instruction issuance unit 31 issues a wait instruction (Wait instruction) to itself (CPU #1) a predetermined number of times, so as to wait during (several times of) the issuance of the load instructions.

In addition, since the wait instruction issuance unit 31 enables the performance of various patterns of tests, the wait instruction issuance unit 31 alters the timing for issuing the store instruction (store instruction issuance timing). Specifically, the wait instruction issuance unit 31 alters the store instruction issuance timing by increasing the number of times of the issuance of the Wait instruction "P" (P is an integer of 0 or more) by the wait instruction issuance unit 31 each time the consecutive load instruction is repeated M times (which will be described later).

Then, the wait instruction issuance unit 31 repeats the process of changing the number of times of the issuance of the Wait instruction "P" after the consecutive load instruction is repeated M times, "L" times (L is an integer of 1 or more). In addition, "L" may be referred to as the number of times of the repetition of the store instruction or a deviation range, and it is assumed that a value corresponding to a possible order guarantee is stored as "L."

The process performed by the wait instruction issuance unit 31 will be described using FIG. 5. FIG. 5 illustrates an example where the wait instruction issuance unit 31 issues the Wait instruction to itself twice, and causes itself to wait during the first to third load instructions (Loads #1 to #3) by the consecutive load instruction issuance unit 25.

For example, as illustrated in FIG. 5, when the load instructions issued by the test target processor 10 are five (Loads #1 to #5), it is preferable that the store instruction is issued by the test auxiliary processor 10 in consideration of all test patterns in view of the nature of the present order guarantee test.

Specifically, tests may be performed in which the store instructions are issued immediately before Load #1, between Loads #1 and #2, between Loads #2 and #3, between Loads #3 and #4, and between Loads #4 and #5, respectively. Accordingly, in the case described above, five types of patterns are tested.

In addition, it is assumed that the value of the number of times of the repetition "L" is determined according to the range of the load instructions to be subjected to the present test (Loads #1 to #5 in the example of FIG. 5). In the present embodiment, in order to avoid a situation where the store instruction is issued after the consecutive load instruction is completed, a test having a pattern in which the store instruction is issued immediately after Load #5 is not performed. Thus, it is assumed that the value of the number of times of the repetition of the consecutive load instruction "M" is determined by the number of times of the repetition of the store instruction "L," and thus, is larger than the value of the number of times of the repetition of the store instruction "L."

In addition, for example, when the test in which the store instruction is issued between Loads #2 and #3 is performed after the test in which the store instruction is issued between Loads #1 and #2, the wait instruction issuance unit 31 needs to issue more Wait instructions than the number of Wait instructions issued in the previous test. Accordingly, the wait instruction issuance unit 31 alters the store instruction issuance timing by changing the number of times of the execution of the Wait instruction "P," so as to enable the verification of the various patterns in the present order guarantee test.

In this way, the consecutive load instruction issuance unit 25 of the test target processor 10 repeats the consecutive load instruction for consecutively issuing the load instructions N times, M times. During the repetition, the wait instruction issuance unit 31 of the test auxiliary processor 10 issues the Wait instruction P times, and thereafter, the auxiliary store instruction issuance unit 32 issues the store instruction once. Then, the series of processes is repeated as many as the number of times of the repetition of the store instruction (L times), and the process is terminated. Accordingly, M×N load instructions are repeated L times until the series of process is terminated.

The auxiliary store instruction issuance unit 32 waits for an arbitrary time of the load instructions issued by the test target processor 10, due to the Wait instructions issued by the wait instruction issuance unit 31, and then, issues the store instruction once. The store instruction issued by the auxiliary store instruction issuance unit 32 is to store a predetermined value in the test target area 121, and the value is different from the value stored by the store instruction issued by the initialization unit 21.

FIG. 5 illustrates a case where the auxiliary store instruction issuance unit 32 issues the store instruction after the test target processor 10 issues the third load instruction. Further, FIG. 5 illustrates a case where the value stored by the store instruction issued by the auxiliary store instruction issuance unit 32 is "0xf" which is different from the value stored by the store instruction issued by the initialization unit 21 ("0x0"). In addition, it is assumed that the auxiliary store instruction issuance unit 32 issues the store instruction at the store instruction issuance timing.

In addition, the process of each functional configuration described above is implemented by executing the test program 100 stored in the memory 12.

<1-4> Control Process of Order Guarantee Test in Arithmetic Processing Apparatus According to Embodiment The control process of the order guarantee test in the arithmetic processing apparatus 1 which is an example of the embodiment configured as described above will be described according to the flowchart (steps S1 to S16) illustrated in FIG. 9. Here, a test for accesses to the same address will be described as the order guarantee test.

Figure 9:
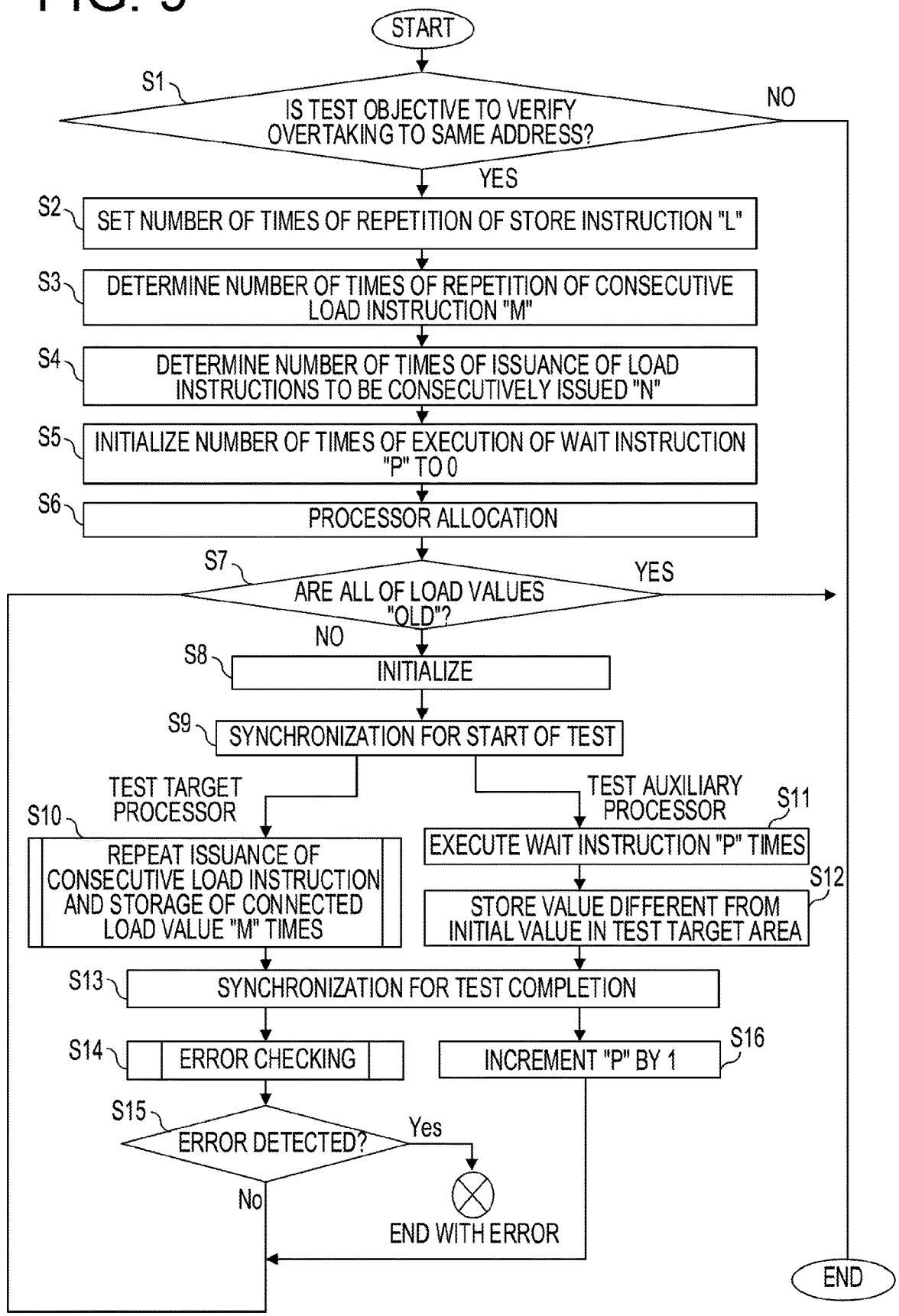
FIG. 9 is a view illustrating a control process of an order guarantee test in the arithmetic processing apparatus which is an example of the embodiment.

FIG. 9 is a flowchart for explaining the control process of the order guarantee test in the arithmetic processing apparatus 1 according to the embodiment.

The contents of the test for accesses to the same address which is the order guarantee test in the present embodiment will be described using FIG. 9. In the present embodiment, it is assumed that the test is performed in the unit of the pair obtained by combining the two processors 10 with each other, and FIG. 9 illustrates a case where the test is performed with the pair of the two processors 10 including CPUs #0 and #1.

In addition, CPUs #0 and #1 use the same test target area 121 on the memory 12.

In step S1, the initialization unit 21 determines whether the test to be performed from now on (test objective) is to verify an occurrence/non-occurrence of an overtaking to the same address. Since the determination method is well-known, descriptions thereof will be omitted herein.

When it is determined in step S1 that the test objective is to verify an overtaking to the same address (see the "Yes" route in step S1), the process proceeds to step S2. Meanwhile, when it is determined that the test objective is not to verify an overtaking to the same address (see the "No" route in step S1), the process is terminated.

In subsequent S2, the wait instruction issuance unit 31 sets the value of the number of times of the repetition of the store instruction "L." Since the setting method is well-known, descriptions thereof will be omitted herein.

In subsequent step S3, the consecutive load instruction issuance unit 25 determines the number of times of the repetition of the consecutive load instruction "M," based on the number of times of the repetition of the store instruction "L" set in step S1.

In subsequent step S4, the consecutive load instruction issuance unit 25 determines the number of times of the load instructions to be consecutively issued "N," based on the number of registers "N" of CPU #0 which is the test target processor 10.

In subsequent step S5, the wait instruction issuance unit 31 initializes the value of the number of times of the execution of the Wait instruction "P" to 0.

In subsequent step S6, first, one of the two processors 10 constituting each pair is allocated to the test target processor 10, and the other is allocated to the test auxiliary processor 10. Here, descriptions will be made with an example where, in Pair #1, CPU #0 is allocated to the test target processor 10, and CPU #1 is allocated to the test auxiliary processor 10.

In subsequent step S7, the error checking unit 27 of the test target processor 10 determines whether all of the load values are "Old." It is assumed that not all of the load values, that is, the load values stored in the load value storage area 122 are "Old" at the time of staring the present test.

When it is determined in step S7 that not all of the load values are "Old" (the "No" route in step S7), the process proceeds to step S8.

In subsequent step S8, the initialization unit 21 of the test target processor 10 issues the store instruction to the test target area 121 of the memory 12 so as to initialize the test target area 121, and stores the initial value (e.g., "0x0"). Further, the initialization unit 21 also initializes the value of "N" that indicates the number of times of the load instructions to be issued consecutively by the consecutive load instruction issuance unit 25, to "0."

In subsequent step S9, the test target processor 10 and the test auxiliary processor 10 are synchronized with each other for the start of the test by using a clock generator (not illustrated) or the like.

After the synchronization for the start of the test in step S9, the order guarantee test is started. Hereinafter, descriptions will be made on each of the process (steps S10 and S13 to S15) performed by the side of the test target processor 10 and the process (steps S11 to S13 and S16) performed by the side of the test auxiliary processor 10 in the order guarantee test. First, the order guarantee test on the side of the test target processor 10 will be described.

On the side of the test target processor 10, the consecutive load instruction issuance unit 25 issues the consecutive load instruction to the same address M times, in step S10. That is, the consecutive load instruction issuance unit 25 repeats the issuance of the load instructions consecutively issued N times, M times. Then, the result storage unit 26 generates the connected load value using the load values which are the results obtained from the issuance of the consecutive load instruction M times, and stores the connected load value in the load value storage area 122 (see FIGS. 5 and 6). The specific process of step S10 will be described according to the flowchart (steps T1 to T4) illustrated in FIG. 10.

Figure 10:
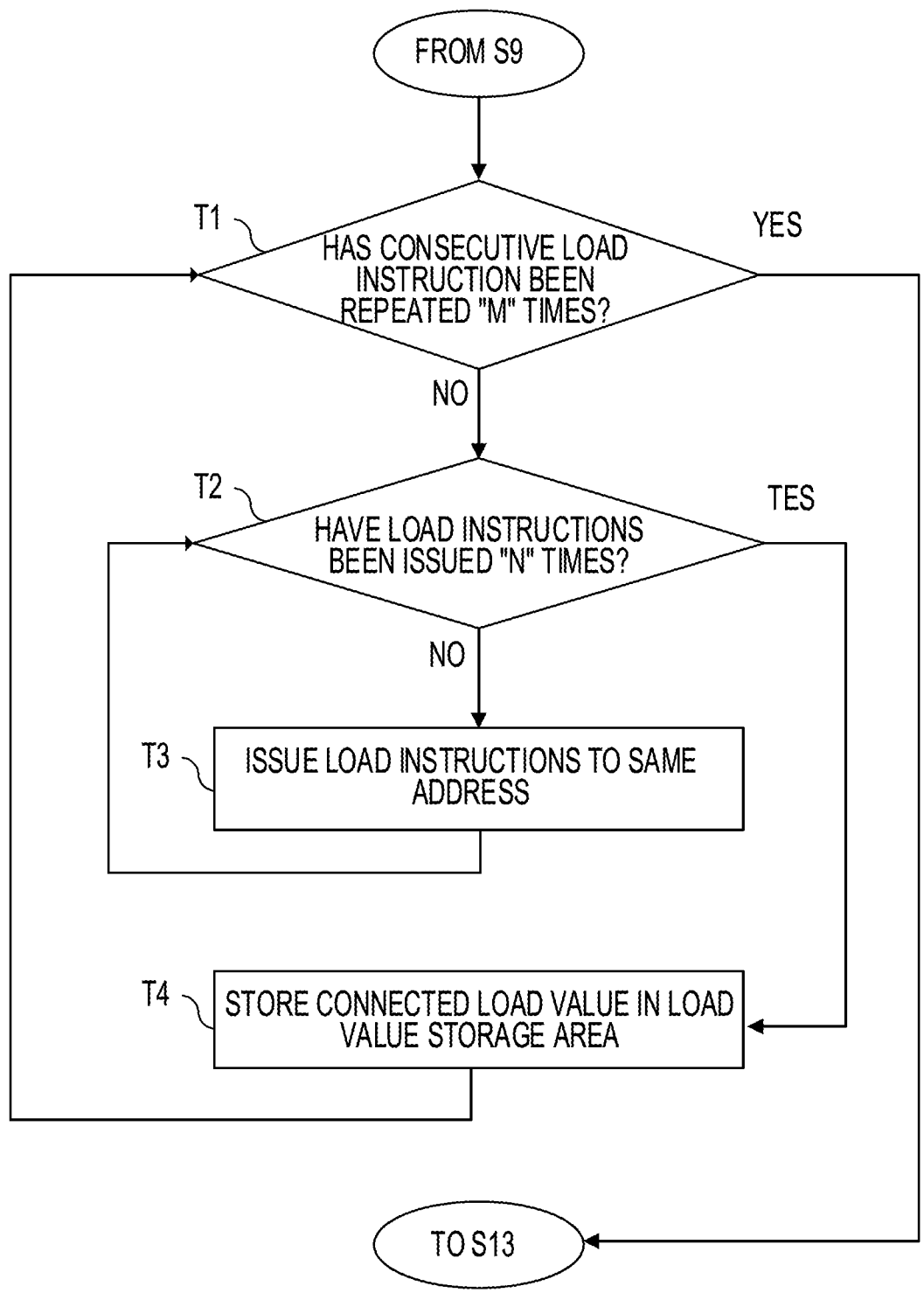
FIG. 10 is a view illustrating a process according to the order guarantee test in a test target processor, in the arithmetic processing apparatus which is an example of the embodiment.

FIG. 10 is a flowchart for explaining the process performed by the test target processor 10 in the order guarantee test, in the arithmetic processing apparatus 1 according to the embodiment. In addition, in the drawings to be used in the embodiment described hereinbelow, the portions denoted by the same reference numerals indicate the same or similar portions unless otherwise specified.

After the synchronization for the start of the test in step S9 of FIG. 9 described above, the consecutive load instruction issuance unit 25 repeats the issuance of the consecutive load instruction to itself M times, in step T1 of FIG. 10. When the issuance of the consecutive load instruction is repeated M times (see the "Yes" route in step T1), the process proceeds to step S13 of FIG. 9. Meanwhile, when the issuance of the consecutive load instruction is not repeated M times (see the "No" route in step T1), the process proceeds to step T2. In addition, since the issuance of the consecutive load instruction is not yet repeated at the time of the first execution of the issuance of the consecutive load instruction, the process proceeds to step T2.

In step T2, the consecutive load instruction issuance unit 25 checks whether the load instructions have been issued by itself N times. When the load instructions have been issued N times (see the "Yes" route in step T2), the process proceeds to step T4. Meanwhile, when the load instructions have not been issued N times (see the "No" route in step T2), the process proceeds to step T3. In addition, since the load instructions are not yet issued at the time of the first execution of the issuance of the load instructions, the process proceeds to step T3.

In step T3, the consecutive load instruction issuance unit 25 issues a load instruction to the test target area 121 which is the same address. Then, the process returns to step T2. That is, the consecutive load instruction issuance unit 25 issues the load instruction to the test target area 121 which is the same address, N times.

In step T4, the result storage unit 26 integrates the load values obtained from the load instructions issued N times in step T3 described above to generate the connected load value, and stores the connected load value in the load value storage area 122. Then, the process returns to step T1. That is, each time the N load values are obtained, the result storage unit 26 generates the connected load value and stores the connected load value in the load value storage area 122.

In this manner, the order guarantee test on the side of the test target processor 10 is performed by repeating issuing the load instructions N times and storing the connected load value M times which are illustrated in steps T2 to T4 (step T1).

Subsequently, referring back to the description of the control process of the order guarantee test illustrated in FIG. 9, the process on the side of the auxiliary test processor 10 will be described.

In step S11, after the synchronization for the start of the test illustrated in step S9 of FIG. 9 described above, the wait instruction issuance unit 31 of the test auxiliary processor 10 issues the Wait instruction P times, so as to make itself be in the wait state.

In subsequent step S12, the auxiliary store instruction issuance unit 32 issues the store instruction to the test target area 121 which is the same address, once. In addition, the value stored in the test target area 121 by the store instruction issued by the auxiliary store instruction issue unit 32 (e.g., "0xf") is necessarily different from the value stored by the store instruction issued by the initialization unit 21 ("0x0").

In step S13, the test target processor 10 and the test auxiliary processor 10 are synchronized with each other for the test completion guarantee, using a clock generator (not illustrated) or the like at the time when the issuance of the consecutive load instruction by the test target processor 10 M times is completed, after the issuance of the store instruction by the test auxiliary processor 10.

In step S14, the error checking unit 27 of the test target processor 10 determines whether the load values have changed twice (or more). The specific process of step S14 will be described according to the flowchart (Q1 to Q12) illustrated in FIG. 11.

Figure 11:
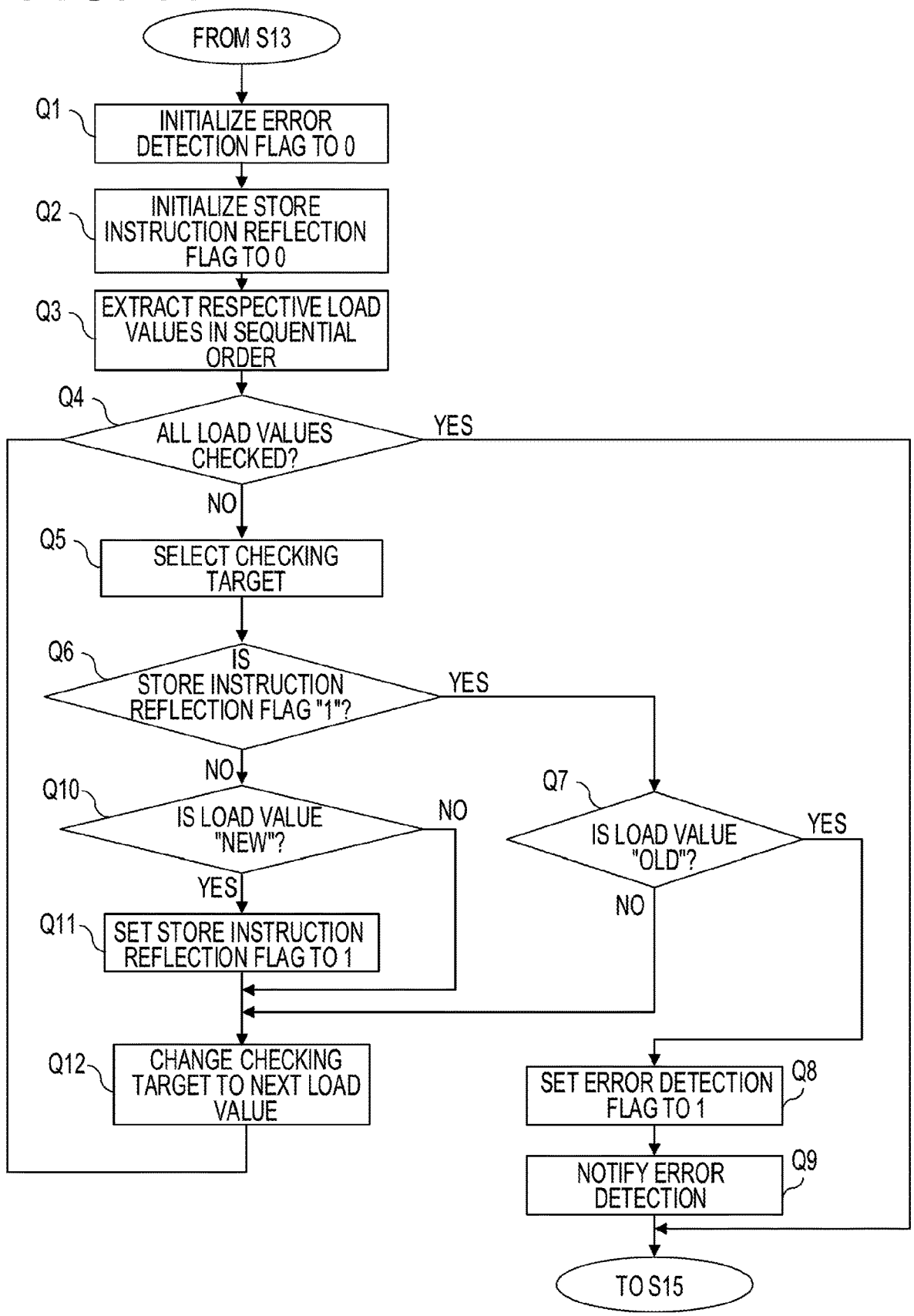
FIG. 11 is a view illustrating a process performed by an error checking unit in the arithmetic processing apparatus which is an example of the embodiment.

FIG. 11 is a view illustrating the process performed by the error checking unit 27 of the test target processor 10 in the arithmetic processing apparatus 1 according to the embodiment. In addition, in the drawings to be used in the embodiment described hereinbelow, the portions denoted by the same reference numerals indicate the same or similar portions unless otherwise specified.

In step Q1, the error checking unit 27 of the test target processor 10 initializes an error detection flag F1 to 0. The error detection flag F1 indicates whether a change of the load values is detected by the error checking unit 27.

For example, when the value of the error detection flag F1 is 1, the value indicates that an occurrence of an overtaking (error) is detected by the error checking unit 27. Meanwhile, when the value of the error detection flag F1 is 0, the value indicates that no occurrence of an overtaking (error) is detected by the error checking unit 27. In addition, although not illustrated, the error detection flag F1 may be stored in, for example, the memory 12, and the error checking unit 27 may set the value of the error detection flag F1 (0 or 1).

In subsequent step Q2, the error checking unit 27 of the test target processor 10 initializes a store instruction reflection flag F2 to 0. The store instruction reflection flag F2 indicates that the error checking unit 27 estimates that the issuance of the store instruction has been performed by the auxiliary store instruction issuance unit 32 of the test auxiliary processor 10 or the issuance of the corresponding store instruction has not been performed. The error checking unit 27 makes the estimation based on a change of the load values.

For example, when the value of the store instruction reflection flag F2 is 1, the value indicates that it is estimated that the store instruction has been issued by the auxiliary store instruction issuance unit 32. Meanwhile, when the value of the store instruction reflection flag F2 is 0, the value indicates that it is estimated that the store instruction has not been issued by the auxiliary store instruction issuance unit 32. In addition, although not illustrated, the store instruction reflection flag F2 may be stored in, for example, the memory 12, and the error checking unit 27 may set the value of the store instruction reflection flag F2 (0 or 1) based on a change of the load values.

In subsequent step Q3, the error checking unit 27 acquires all the connected load values obtained this time through the processes of steps S10 to S12, from the load value storage area 122. Then, the error checking unit 27 extracts the respective (multiple) load values included in the acquired connected load values in a sequential order.

In subsequent step Q4, the error checking unit 27 determines whether all of the load values have been checked. When it is determined that all of the load values have been checked (see the "Yes" route in step Q4), the process performed by the error checking unit 27 is ended, and the process proceeds to step S15 illustrated in FIG. 9. Meanwhile, when it is determined that all of the load values have not been checked (see the "No" route in step Q4), the process proceeds to step Q5. In addition, since the load values are not yet checked at the time of the first execution, the process proceeds to step Q5.

In step Q5, the error checking unit 27 selects a checking target. The checking target refers to the load value extracted in step Q3 and is the load value to be subjected to the determination of an overtaking in the processes after step Q4. In addition, at the time of the first execution, the load value read for the first time is the checking target.

In subsequent step Q6, the error checking unit 27 determines whether the store instruction reflection flag F2 is 1. When it is determined that the store instruction reflection flag F2 is 1 (see the "Yes" route in step Q6), the process proceeds to step Q7.

In step Q7, the error checking unit 27 determines whether the load value is "Old." When the store instruction reflection flag F2 is 1, it may be estimated that the store instruction has been issued by the auxiliary store instruction issuance unit 32, and thus, it is expected that the load value issued after the corresponding store instruction will change to "New." Accordingly, when it is determined in step Q7 that the load value is not "Old" and has changed to "New" (see the "No" route in step Q7), the error checking unit 27 determines that the expected value is obtained. Then, the process proceeds to step Q12.

Meanwhile, when it is determined that the load value remains "Old" (see the "Yes" route in step Q7), the error checking unit 27 determines that the value stored by the store instruction issued by the auxiliary store instruction issuance unit 32 ("New") is not loaded, and the expected value is not obtained. That is, it is estimated that the load value has changed from "Old" to "New," and then, has changed from "New" to "Old" so that the load value has changed twice. Thus, the error checking unit 27 determines that an overtaking has occurred. Then, the process proceeds to step SQ8.

In step Q8, the error checking unit 27 sets the value of the error detection flag F1 to 1, and the process proceeds to step S9.

In subsequent step Q9, since the error checking unit 27 determines that an overtaking has occurred, the error notification unit 24 of the test target processor 10 notifies, for example, the administrator of the order guarantee test or the arithmetic processing apparatus 1 of the occurrence of the overtaking. Then, the process proceeds to step S15 of FIG. 9.

Meanwhile, when it is determined in step Q6 that the store instruction reflection flag F2 is not 1 (see the "No" route in step Q6), the process proceeds to step Q10.

In subsequent step Q10, the error checking unit 27 determines whether the load value is "New." When it is determined that the load value is "New" (see the "Yes" route in step Q10), the process proceeds to step S11.

In subsequent step Q11, the error checking unit 27 sets the value of the store instruction reflection flag F2 to 1. This is because the determination in step Q10 that the load value is "New" indicates that there is a change in the values stored in the test target area 121, and thus, it is estimated that the store instruction has been issued by the auxiliary store instruction issuance unit 32.

Meanwhile, when it is determined in step Q10 that the load value is not "New" (remains "Old") (see the "No" route in step Q10), step Q11 is skipped, and the process proceeds to step Q12. This is because there has been no change in the values stored in the test target area 121, and thus, the error checking unit 27 estimates that no store instruction has been issued by the auxiliary store instruction issuance unit 32.

In step Q12, the error checking unit 27 selects a load value read subsequent to the load value which has been the checking target, as a (subsequent) checking target. Then, the process returns to step Q4.

As described above, according to the flowchart illustrated in FIG. 11, when the load values have changed twice (or more), the first change ("Old" to "New") is detected in step Q10. Then, in step Q11, the value of the store instruction reflection flag F2 is set to 1. Then, in the next loop, the process proceeds to step Q7 since the value of the store instruction reflection flag F2 is 1 in step Q6. In step Q7, it is determined whether the load value is "Old." However, when the second change is currently occurring, there occurs a situation where the load value returns from "New" back to "Old" (while the expected value remains "New"). In this case, it is determined in step Q7 that the load value is "Old" (has returned to "Old"), so that the two changes in the load values, that is, an occurrence of an overtaking (error) can be detected through the "Yes" route in step Q7.

Referring back to the description of the control process of the order guarantee test illustrated in FIG. 9, it is determined in step S15 whether an occurrence of an overtaking, that is, an error, is detected in step S14. Specifically, the error checking unit 27 checks whether the value of the error detection flag F1 is 1. When it is determined that an error is detected (see the "Yes" route in step Q15), the process is ended with the error. Meanwhile, when no error is detected (see the "No" route in step Q15), the process returns to step S7.

In step S16, the wait instruction issuance unit 31 of the test auxiliary processor 10 increments the value of P, so that the process returns to step S7 to continue the order guarantee test in the next pattern.

When the error checking unit 27 determines in step S7 that all of the load values are "Old" (the "Yes" route at step S7), the process is ended.

<2> Modification of Embodiment

In FIGS. 1 to 11 described above, the order guarantee test is performed in the unit of the pair including the two processors 10. However, in the present modification, descriptions will be made on an order guarantee test performed in the unit of a pair including two cores in an arithmetic processing unit 1 including a multi-core processor 10.

Figure 12:
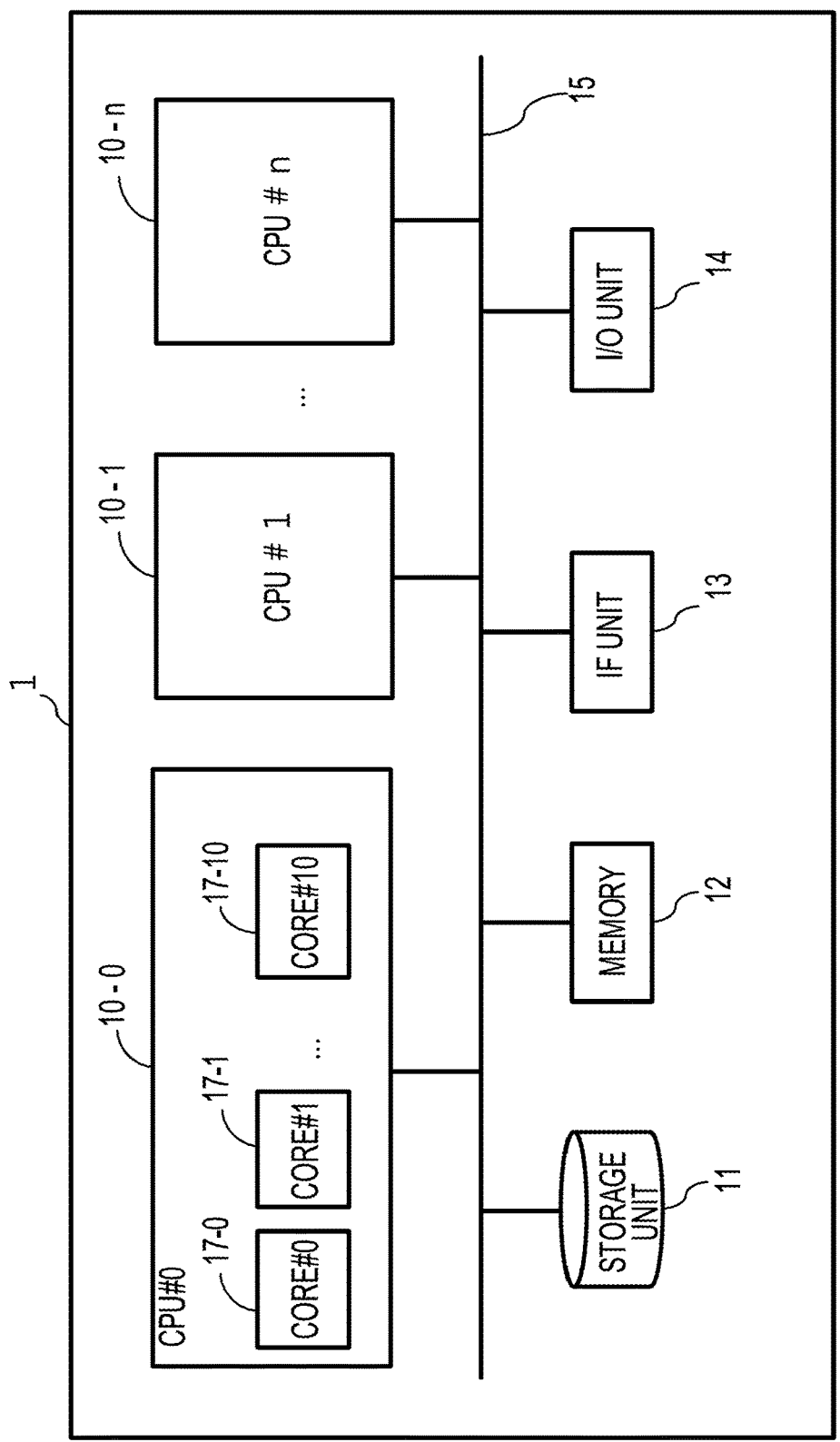
FIG. 12 is a view illustrating a hardware configuration of an arithmetic processing apparatus according to a modification of the embodiment.

<2-1> Example of Hardware Configuration of Arithmetic Processing Apparatus According to Modification of Embodiment FIG. 12 is a view illustrating a hardware configuration of an arithmetic processing apparatus 1 according to a modification of the embodiment.

The arithmetic processing apparatus 1 according to the present modification has a multiprocessor configuration including multiple CPUs 10, as in the embodiment described above, and may include the storage unit 11, the memory 12, the IF unit 13, and the I/O unit 14. Further, as in the embodiment described above, the arithmetic processing apparatus 1 includes one or more CPUs 10-0 (CPU #0), 10-1 (CPU #1), . . . , 10-n (n is an integer of 0 or more), and when an arbitrary CPU is referred to, the reference numeral 10 will be used. Since the storage unit 11, the memory 12, the IF unit 13, and the I/O unit 14 are the same as those in the embodiment described above, descriptions thereof will be omitted.

Each CPU 10 according to the present modification has a multi-core configuration, and it is assumed that each CPU 10 has eleven cores 17-0 to 17-10 in the present modification illustrated in FIG. 12. As illustrated in FIG. 12, CPU #0 includes eleven cores 17 including Cores 17-0 to 17-10. In addition, the numerals "0," "1," "2," . . . , "10" next to the symbol "#" in the cores may be simply referred to as core numbers.

Hereinafter, with respect to the reference numerals indicating the cores, when one of the multiple cores needs to be specified, the reference numerals 17-0, . . . , 17-10 will be used, and when an arbitrary core is indicated, the reference numeral 17 will be used. In the present modification, each CPU 10 includes the eleven cores 17. However, each CPU 10 may include ten or less or twelve or more cores 17.

<2-2> Example of Hardware Configuration of Order Guarantee Test in the Arithmetic Processing Apparatus According to Modification Descriptions will be made on an example of the hardware configuration of the order guarantee test in the arithmetic processing apparatus 1 according to the present modification, using FIG. 13.

Figure 13:
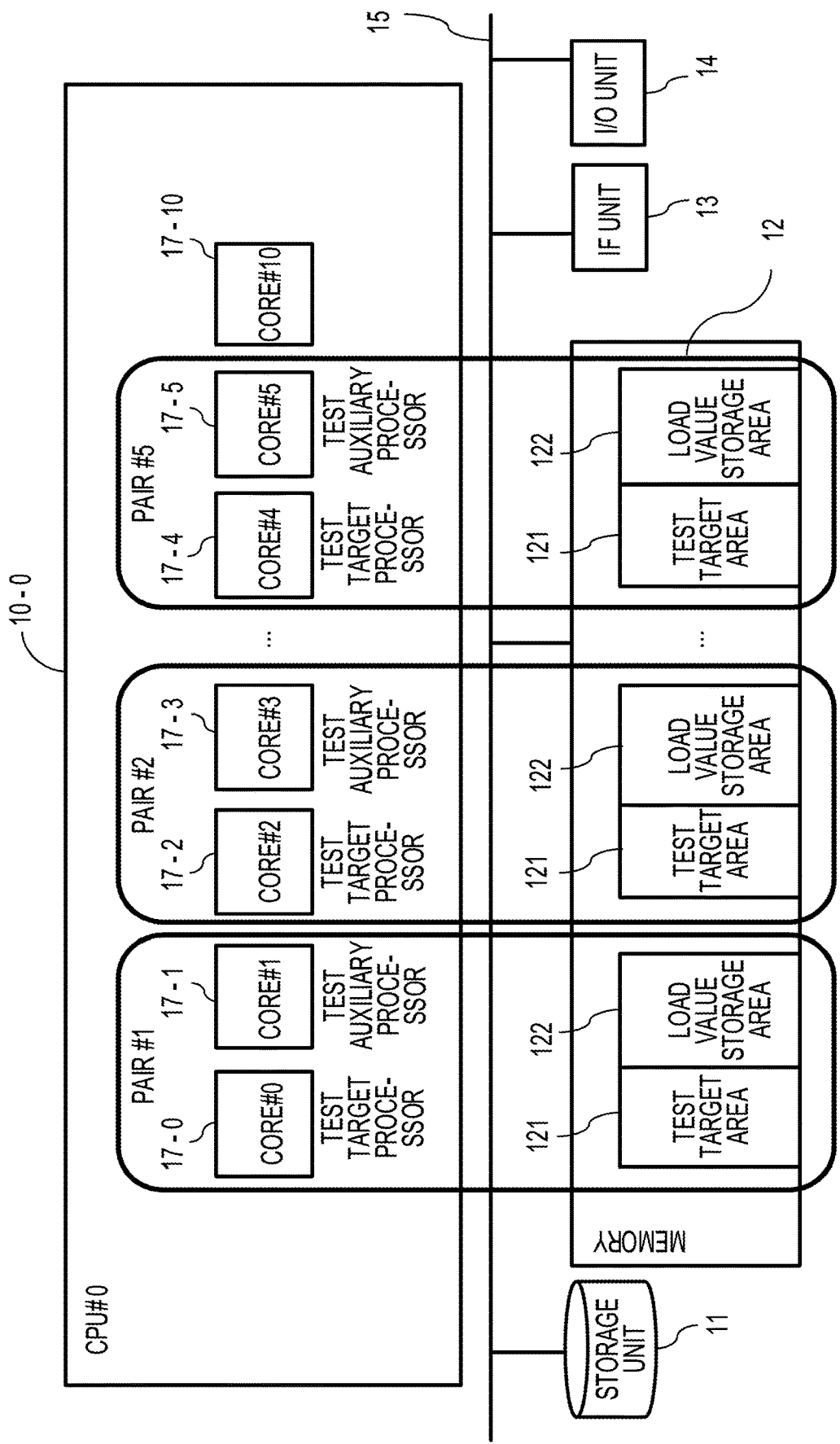
FIG. 13 is a view illustrating a hardware configuration of an order guarantee test in the arithmetic processing apparatus according to the modification of the embodiment.

FIG. 13 is a view illustrating the hardware configuration of the order guarantee test in the arithmetic processing of the apparatus 1 which is the modification illustrated in FIG. 12.

As illustrated in FIG. 13, in the present modification, it is assumed that two processors 17 are combined with each other to form a pair, and the order guarantee test is performed in the unit of the pair.

FIG. 13 illustrates an example where Cores #0 and #1 are combined with each other to form Pair #1, Cores #2 and #3 are combined with each other to form Pair #2, and Cores #8 and #9 are combined with each other to form Pair #5, and the order guarantee test is performed in the unit of the pairs. In addition, in the present modification, the cores 17 of which the core numbers are adjacent to each other are combined with each other to form a pair. However, the combination method is not limited thereto. FIG. 13 illustrates a case where the cores 17 of CPU #0 are combined with each other to form a pair. However, a core 17 of CPU #0 and a core 17 of another CPU 10 may be combined with each other to form a pair.

In each pair, one core 17 is caused to function as a core 17 to be tested, that is, a test target core 17, and the other core 17 is caused to function as a core 17 which causes an overtaking status, that is, a test auxiliary core 17. FIG. 13 illustrates a case where Cores #0, #2, and #8 are caused to function as the test target cores 17, and Cores #1, #3, and #9 are caused to function as the test auxiliary cores 17.

In the present modification, in each pair, the core 17 of which the core number is relatively small or is an even number (Core #0, #2 or #8) is allocated to the test target core 17. However, the present disclosure is not limited thereto. In the present modification, in each pair, the core 17 of which the core number is relatively large or an odd number (Core #1, #3 or #9) is allocated to the test auxiliary core 17. However, the present disclosure is not limited thereto.

As illustrated in FIG. 13, the memory 12 includes the test target area 121 and the load value storage area 122 for each pair. Since the test target area 121 and the load value storage area 122 are the same as those of the embodiment described above, descriptions thereof will be omitted.

The functional configuration of the arithmetic processing apparatus 1 according to the modification configured as described above has the same functions as those in the embodiment described above (see FIGS. 2 to 6), by applying the cores 17 instead of the CPUs 10 in the embodiment.

In the control process of the order guarantee test in the arithmetic processing apparatus 1 according to the modification configured as described above, the same effects as those in the control process in the embodiment described above (see FIGS. 9 to 11) may be obtained, by applying the cores 17 instead of the CPUs 10 in the embodiment.

<3> Effects

As described above, in the arithmetic processing apparatus 1 according to the embodiment and the modification, the consecutive load instruction issuance unit 25 consecutively issues the load instructions. As a result, the interval of accesses to the same address may be shortened.

In the arithmetic processing apparatus 1 according to the embodiment and the modification, the order guarantee test may be performed while the wait instruction issuance unit 31 alters the store instruction issuance timing by changing the number of times of the issuance of the Wait instruction (the value of P). As a result, the store instruction may be reliably executed among the multiple load instructions issued by the test target processor 10.

Accordingly, since an overtaking may be reliably caused in the present order guarantee test, the order guarantee for the same address may be reliably verified.

MISCELLANEOUS

The technique according to the above-described embodiment and modification may be changed or modified as described below.

In the above-described embodiment and modification, descriptions have been made on the order guarantee test for verifying that an overtaking of a preceding load instruction by a subsequent load instruction does not occur. However, by replacing the load instruction with the store instruction, a validity of an order guarantee circuit for the store instruction may be verified. In that case, the store auxiliary processor 10 may perform the issuance of the store instruction multiple times.

In the above-described embodiment and modification, the error checking unit 27 sets the values of the error detection flag F1 and the store instruction reflection flag F2. However, the test auxiliary processor 10 may set the values of the error detection flag F1 and the store instruction reflection flag F2. In that case, it is desirable that the error detection flag F1 and the store instruction reflection flag F2 are stored in the memory 12.

In the above-described embodiment and modification, all the tests are ended when the wait instruction issuance unit 31 determines that the number of times of the issuance of the Wait instruction is larger than P. However, all the tests may be ended with the power-off of a power source.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An arithmetic processing apparatus, comprising:
    a memory;
    a first processor that adopts a relaxed memory ordering (RMO) method and is coupled to the memory; and
    a second processor coupled to the memory,
    the first processor is configured to:
        consecutively issue a plurality of load instructions for loading respective data from a same address of the memory to test an ordering property; and
        determine, when the respective data are loaded, whether the ordering property is guaranteed, based on values that are included in the respective data loaded from the same address of the memory, the values being arranged in an order loaded from the memory,
        integrate the values to generate a connected load value;
        store the connected load value in a predetermined storage area; and
        perform the determination based on the connected load value stored in the predetermined storage area, and
    the second processor is configured to:
        synchronize with the first processor for start testing the ordering property; and
        issue a store instruction during the issuance of the plurality of load instructions with respect to the memory,
    the determination on whether the ordering property is guaranteed is made based on whether the values are changed twice or more.

2. The arithmetic processing apparatus according to claim 1, wherein the second processor is further configured to issue the store instruction to the same address of the memory to which the load instructions are issued by the first processor.

3. The arithmetic processing apparatus according to claim 1, wherein the second processor is further configured to:
    change a timing for issuing the store instruction with respect to a consecutive issuance of the load instructions, each time the consecutive issuance of the load instructions, the issuance of the store instruction, and the determination are repeated.

4. A control method, comprising:
    consecutively issuing, by a first processor that adopts a relaxed memory ordering (RMO) method, a plurality of load instructions for loading respective data from a same address of a memory to test an ordering property;
    synchronizing, by a second processor, with the first processor for start testing the ordering property;
    issuing, by the second processor, a store instruction during the issuance of the plurality of load instructions with respect to the memory;
    determining, by the first processor, when the respective data are loaded, whether the ordering property is guaranteed, based on values that are included in the respective data loaded from the same address of the memory, the values being arranged in an order loaded from the memory,
    integrating, by the first processor, the values to generate a connected load value,
    storing, by the first processor, the connected load value in a predetermined storage area, and
    performing, by the first processor, the determination based on the connected load value stored in the predetermined storage area,
    the determination on whether the ordering property is guaranteed is made based on whether the values are changed twice or more.

5. The control method according to claim 4, wherein the second processor issues the store instruction to the same address of the memory to which the load instructions are issued by the first processor.

6. The control method according to claim 4, wherein the second processor changes a timing for issuing the store instruction with respect to a consecutive issuance of the load instructions, each time the consecutive issuance of the load instructions, the issuance of the store instruction, and the determination are repeated.

7. The arithmetic processing apparatus according to claim 1, wherein the second processor is further configured to:
    issue a wait instruction a predetermined number of times after the synchronization, so as to wait until a predetermined timing during the issuance of the plurality of load instructions.

8. The control method according to claim 4, wherein the second processor issues a wait instruction a predetermined number of times after the synchronizing, so as to wait until a predetermined timing during the issuance of the plurality of load instructions.

* * * * *